(12) United States Patent
Shank et al.

(10) Patent No.: US 9,896,984 B2
(45) Date of Patent: Feb. 20, 2018

(54) ORIFICE PLATE FLOW PATH STABILIZER

(71) Applicant: Continental Automotive Systems, Inc., Auburn Hills, MI (US)

(72) Inventors: Justin A Shank, Williamsburg, VA (US); Dean L Spiers, Yorktown, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/048,261

(22) Filed: Feb. 19, 2016

(65) Prior Publication Data
US 2017/0191400 A1 Jul. 6, 2017

Related U.S. Application Data

(60) Provisional application No. 62/273,259, filed on Dec. 30, 2015.

(51) Int. Cl.
*A62C 37/20* (2006.01)
*F01N 3/28* (2006.01)
*F02M 61/18* (2006.01)

(52) U.S. Cl.
CPC ....... *F01N 3/2896* (2013.01); *F02M 61/1853* (2013.01)

(58) Field of Classification Search
CPC ........... F02M 51/0675; F02M 61/1886; F02M 61/188; F02M 61/1813; F02M 2200/03; F02M 2200/8084; F02M 61/12; Y10T 29/49409

USPC .......................................................... 239/562
See application file for complete search history.

(56) References Cited

U.S. PATENT DOCUMENTS

| | | | | |
|---|---|---|---|---|
| 2005/0067508 A1* | 3/2005 | Imoehl | ................. | F02M 61/168 239/533.12 |
| 2006/0086830 A1* | 4/2006 | Omura | ............... | F02M 61/1853 239/533.12 |
| 2008/0203194 A1* | 8/2008 | Aoki | .................. | F02M 61/1806 239/533.12 |
| 2009/0057446 A1* | 3/2009 | Hung | ................. | F02M 61/1853 239/533.12 |
| 2009/0200403 A1* | 8/2009 | Hung | ................. | F02M 61/1806 239/533.12 |
| 2010/0288857 A1* | 11/2010 | Hashii | ................ | F02M 51/0682 239/585.1 |
| 2011/0253812 A1* | 10/2011 | Sakata | ............... | F02M 61/1853 239/533.12 |

\* cited by examiner

*Primary Examiner* — Arthur O Hall
*Assistant Examiner* — Joel Zhou

(57) ABSTRACT

An orifice plate for an injector is provided, which includes a base portion disposed along a base plane. An offset portion is unitarily formed with the base portion. The offset portion is at least partially disposed outside of the base plane. The offset portion defines a flow entry side and a flow exit side, and the offset portion defines a plurality of exit apertures therethrough. A plurality of projections extends from the flow entry side of the offset portion. The plurality of projections is configured to contact an injector surface. An injector and a reductant delivery unit incorporating such an orifice plate are also provided.

22 Claims, 7 Drawing Sheets

ORIFICE PLATE FLOW PATH STABILIZER

CROSS-REFERENCE TO RELATED APPLICATION

This application claims priority to U.S. provisional patent application 62/273,259, filed Dec. 30, 2015 and titled, "ORIFICE PLATE FLOW PATH STABILIZER."

FIELD

The invention relates generally to injectors, and more particularly, an orifice disc for an injector which may be used in a reductant delivery unit.

BACKGROUND

The advent of a new round of stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide ($NO_x$) emissions that are difficult to treat in oxygen-rich exhaust environments characteristic of lean-burn combustion. Exhaust after-treatment technologies are currently being developed that will treat $NO_x$ under these conditions. One of these technologies comprises a catalyst that facilitates the reactions of ammonia ($NH_3$) with the exhaust nitrogen oxides ($NO_x$) to produce nitrogen ($N_2$) and water ($H_2O$). This technology is referred to as Selective Catalytic Reduction (SCR).

Ammonia is difficult to handle in its pure form in the automotive environment. Therefore, it is customary with these systems to use a liquid aqueous urea solution, typically at a 32% concentration of urea solution ($CO(NH_2)_2$). The solution is referred to as AUS-32, and is also known under its commercial name of AdBlue. The urea solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$). The ammonia resulting from the thermolysis and the hydrolysis then undergoes a catalyzed reaction with the nitrogen oxides as described previously.

A reductant delivery unit is typically used to introduce the urea solution into the exhaust stream. To operate most effectively, a reductant delivery unit (RDU) requires good atomization of the urea solution being injected into the exhaust stream. Spray generation, or atomization, is created by the fluid stream breaking into droplets, while being directed in a specific direction. Breakup of the fluid stream is enhanced by keeping the fluid turbulent as it exits the RDU.

Some injectors include a plate which may have several exit apertures through which the fluid passes. If the fluid flow becomes laminar, or streamlined, to the wall of the exit aperture, the fluid droplets become elongated and create large droplets, or "ligaments," which may be undesirable.

One way to attempt to decrease particle size has been to decrease the size of the orifice plate. As the depth or thickness of the exit aperture is minimized, atomization is improved. In addition, tolerances in the exit area of the injector must remain very tight in order to maintain turbulent flow and ensure good atomization. However, manufacturing processes provide for difficulty in achieving the injector designs for good atomization, and the welding process often results in inadequate flow streams. For example, the flow passageway can be obstructed or undesirable changed by the welding process.

Accordingly, there is a need for an orifice plate for an injector which reduces droplet size, and therefore reduces or eliminates the formation of ligaments and large droplets, thereby increasing atomization, where the plate is producible according to the desired design without manufacturing defects.

SUMMARY

The present disclosure provides an orifice plate that may be used as part of a fuel injector or an RDU injector, by way of example. The orifice plate has a plurality of raised surface, dimples, or extensions that contact the valve seat of the injector in order to maintain a desired gap between the valve seat and the orifice plate. Thus, during the welding process, a very small gap can be maintained between the orifice plate and the valve seat because the raised portions, or extensions, stabilize the location of the orifice plate with respect to the valve seat.

In one form, which may be combined with or separate from the other variations disclosed herein, an orifice plate for an injector is provided. The orifice plate includes a base portion disposed along a base plane and an offset portion unitarily formed with the base portion. The offset portion is at least partially disposed outside of the base plane. The offset portion defines a flow entry side and a flow exit side, and the offset portion defines a plurality of exit apertures therethrough. A plurality of projections extends from the flow entry side of the offset portion. The plurality of projections is configured to contact an injector surface.

In another form, which may be combined with or separate from the other forms disclosed herein, a reductant delivery unit for reducing nitrogen oxide ($NO_x$) emissions from a vehicle is provided. The reductant delivery unit includes a fluid injector having a fluid inlet, a fluid outlet, and a passageway providing a flow conduit from the fluid inlet to the fluid outlet. The fluid inlet is configured to receive a source of reducing agent, and the fluid outlet is configured to communicate with an exhaust gas flow path of the vehicle so that the fluid injector controls injection of the reducing agent into the exhaust gas flow path. A valve closing member is movable in the passageway between an open position and a closed position. A seat defines at least one seat passage in communication with the passageway. The seat has an inner portion and an outer portion. In the closed position of the valve closing member, the inner portion of the seat contiguously engages a portion of the valve closing member, thereby closing the seat passage and preventing fluid from exiting the at seat passage. In the open position of the valve closing member, the valve closing member is spaced apart from the seat so that fluid can move through the seat passage. An orifice plate has a base portion disposed along a base plane. The base portion is attached to the outer portion of the seat. The orifice plate has an offset portion unitarily formed with the base portion. The offset portion is at least partially disposed outside of the base plane. The offset portion defines a flow entry side and a flow exit side, and the offset portion defines a plurality of exit apertures therethrough. The orifice plate further comprises a plurality of projections extending from the flow entry side of the offset portion. The plurality of projections contacts the outer portion of the seat.

In yet another form, which may be combined with or separate from the other forms disclosed herein, an injector is provided having an inlet, an outlet, and a passageway providing a fluid flow conduit from the inlet to the outlet. The fluid injector includes a valve closing member movable in the passageway between an open position and a closed position. A solenoid is configured to be energized to move the valve closing member between the open position and the closed position. A seat defines at least one seat passage in communication with the passageway. The seat has an inner portion and an outer portion. In the closed position of the valve closing member, the inner portion of the seat contiguously engages a portion of the valve closing member, thereby closing the seat passage or passages and preventing fluid from exiting the seat passage (or passages). On the other hand, in the open position of the valve closing member, the valve closing member is spaced apart from the seat so that fluid can move through the seat passage. An orifice plate has a base portion disposed along a base plane. The base portion is attached to the outer portion of the seat. The orifice plate has an offset portion unitarily formed with the base portion. The offset portion is at least partially disposed outside of the base plane. The offset portion defines a flow entry side and a flow exit side, and the offset portion defines a plurality of exit apertures therethrough. The orifice plate further comprises a plurality of projections extending from the flow entry side of the offset portion. At least a portion of the projections contact the outer portion of the seat.

Further areas of applicability will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The examples of the present invention will become more fully understood from the detailed description and the accompanying drawings, wherein.

DETAILED DESCRIPTION

The following description is merely exemplary in nature and is in no way intended to limit the invention, its application, or uses.

Figure 1:
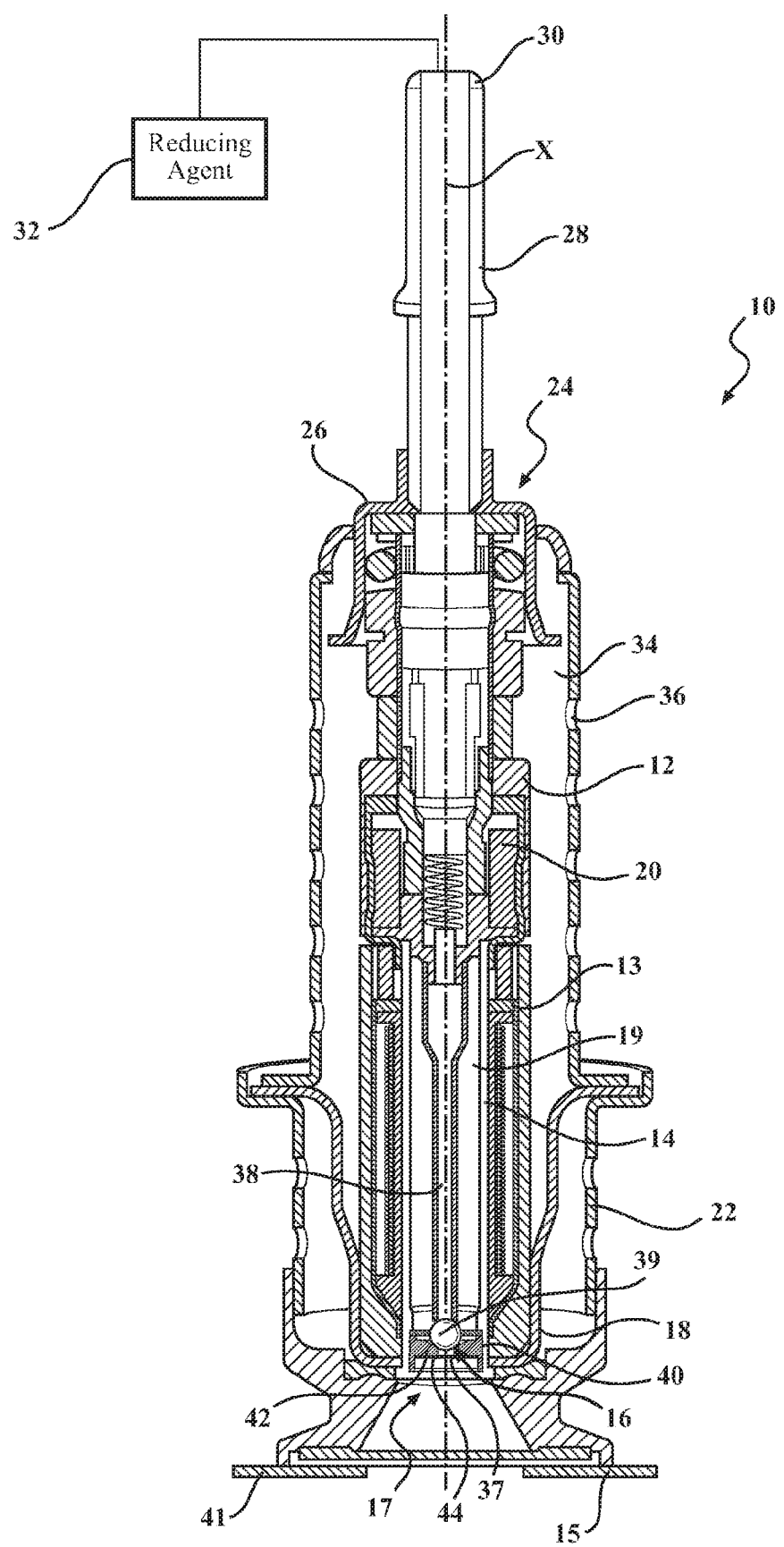
FIG. 1 is cross-sectional view of an RDU including a fluid injector, in accordance with the principles of present disclosure.
Figure 2:
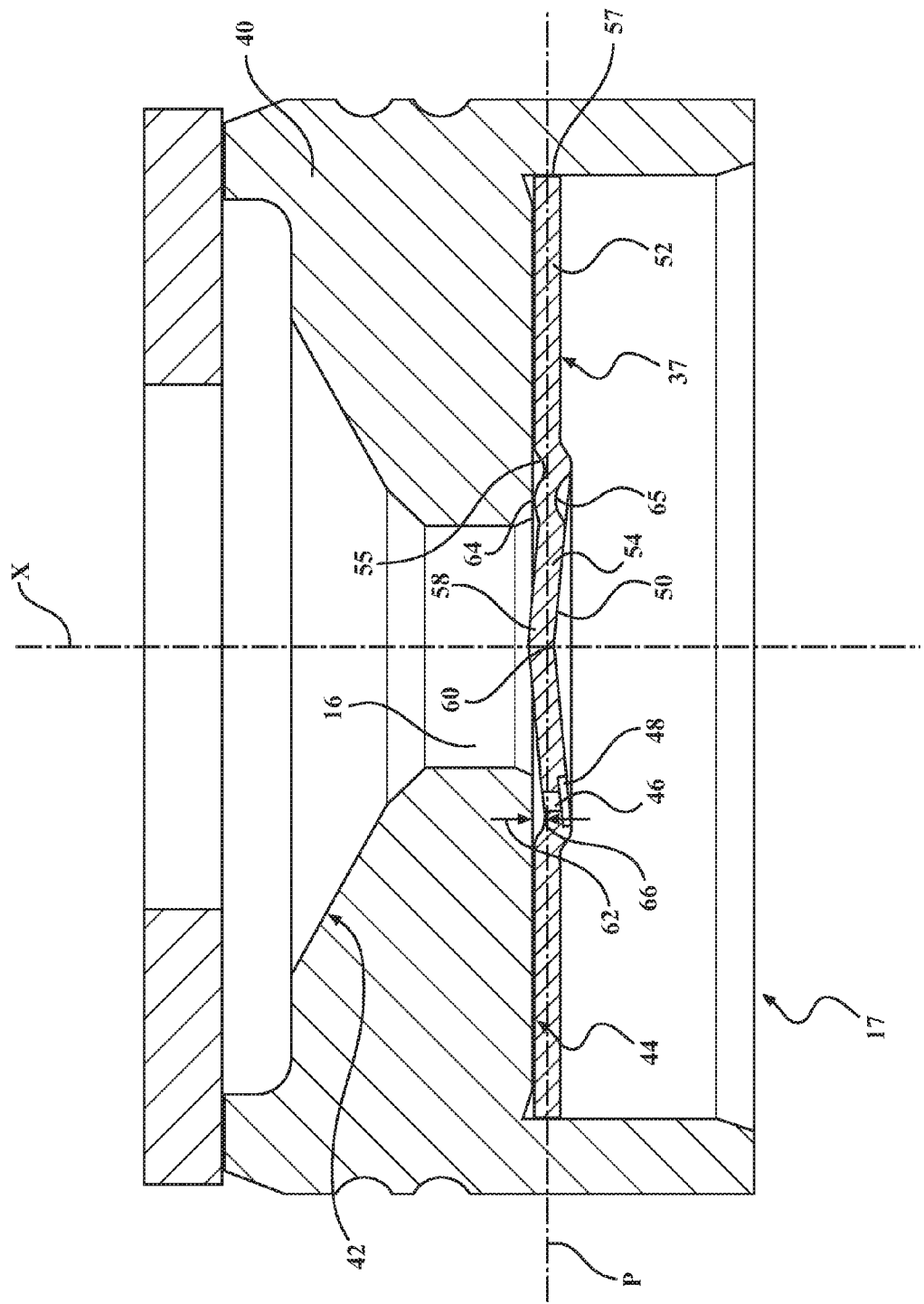
FIG. 2 is a cross-sectional side view of a portion of the RDU of FIG. 1, having an orifice plate, according to the principles of the present disclosure.
Figure 3:
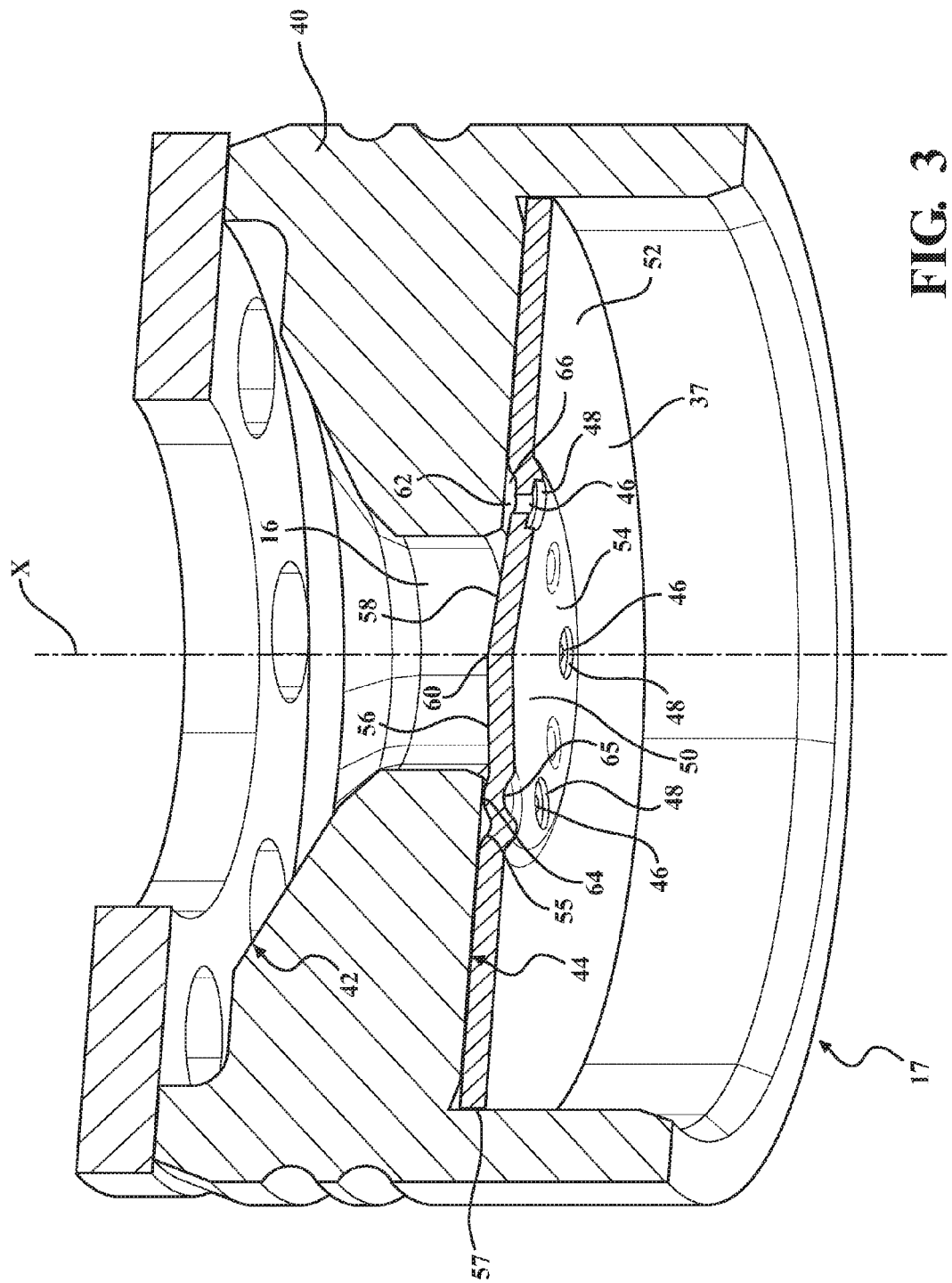
FIG. 3 is a cross-sectional perspective side view of a portion of the RDU of FIGS. 1-2, including the orifice plate, in accordance with the principles of the present disclosure.

With reference to FIGS. 1-2, a reductant delivery unit (RDU) is illustrated and generally indicated at 10. The RDU 10 may be used to introduce a urea solution, or other diesel dosing fluid, into the exhaust stream of a vehicle. For example, the RDU 10 can be employed in a system of the type disclosed in U.S. Pat. No. 8,024,933, the contents of which is hereby incorporated by reference into this specification. The RDU 10 includes a fluid injector 12. Though the present disclosure is described in connection with the RDU 10 having fluid injector 12, it should be understood that the principles described herein could also be used with an injector that is not part of the RDU 10, such as a low-pressure port fuel injector used for injecting gasoline into an engine for combustion in the engine cylinders.

The injector 12 is used for delivering fluid, such as the urea solution, and may employ an inductive coil heater 13 with the goal to transfer heat from the coil heater 13 to an inlet tube 14 of the injector 10 and to the fluid. The solenoid fluid injector 12 provides a metering function of fluid and provides the spray preparation of the fluid into the exhaust gas flow path 15 of a vehicle in a dosing application for reducing nitrogen oxide ($NO_x$) emissions from a vehicle. Thus, the fluid injector 12 is constructed and arranged to be associated with the exhaust gas flow path 15 upstream of a SCR catalytic converter. The fluid injector 12 is preferably a gasoline, electrically operated, solenoid fuel injector such as the type disclosed in U.S. Pat. No. 6,685,112, the contents of which is hereby incorporated by reference into this specification. Thus, a first electromagnetic coil 20 operates the fluid injector 12 when energized.

The fluid injector 12 is disposed inside of an interior carrier 22. An inlet cup structure, generally indicated at 24, includes an inlet cup 26 and an inlet connector 28 integrally formed with or coupled to the inlet cup 26. The inlet connector 28 defines the fluid inlet 30 of the injector 12. The inlet connector 28 is typically in communication with a source of fluid reducing agent 32 such as urea solution that is fed to the injector 12 via the inlet tube 14 to be injected from the fluid outlet 17 of the injector 12. Thus, the inlet tube 14 directs urea solution between the fluid inlet 30 and the fluid outlet 17, through a passageway 19 that provides a flow conduit from the fluid inlet 30 to the fluid outlet 17. The inlet tube 14 can also be considered a valve body.

An injector shield 34 may be coupled to the injector carrier 22 so that the shield 34 is fixed with respect to the injector 12. The shield 34 surrounds at least a portion of the injector 12 and isolates it from environmental factors such as sprayed gravel, high pressure water jets, splashes, etc. The shield 34 also provides structural support to the RDU 10. Openings 36 are provided through the shield 34 for air cooling of the fluid injector 12. In the alternative, the RDU 10 could be liquid-cooled.

The urea solution 32 is fed through the inlet 30 and is delivered under pressure to the solenoid fluid injector 12. The urea solution is metered and exits the injector 12 via a seat passageway 16, through an orifice plate 37, and through the outlet 17, due to movement of a solenoid operated valve 38 and valve closing member 39, wherein the valve closing member 39 is configured to close with respect to the valve seat 40. Thus, the valve structure 38 and the valve closing member 39 (which may be a ball as shown in FIG. 1), is movable within the passageway 19 between an open position and a closed position. The RDU 10 is mounted to the exhaust system 41 with a flange 18, preferably with a V-clamp (not shown). Of course, other mounting methods can be used such as using bolts or other mechanical joining techniques.

To heat the urea solution upon demand and prior to injection, an inductive coil heater 13 is provided in the solenoid injector 12. The inductive coil heater 13 is electrically operated via power applied to injector 12 and when energized, the coil heater 13 provides an electromagnetic field to inductively heat the injector inlet tube 14 and thus heat the urea solution therein adjacent to a heating zone.

The urea solution may be a reducing agent 32, such as AUS-32, ammonia, urea, and/or a urea solution, and it can be appreciated that other reducing agents can be used such as Guanidinium Formate, since the agent is now heated upon injection.

Although the RDU 10 is disclosed for use in an a SCR system, the RDU 10 can be employed in a lean $NO_x$ trap (LNT) system as well, where the reducing agent is diesel fuel (a hydrocarbon-based fuel).

The seat 40 defines at least one seat passage 16 in communication with the passageway 19. Referring to FIGS. 1-2, the seat 40 has an inner portion 42 and an outer portion 44. The inner portion 42 contiguously engages the valve closing member (ball 39) when the valve closing member 39 is the in closed position, thereby preventing fluid from exiting through the seat passage 16. In the open position of the valve closing member 39, however, the valve closing member 39 is spaced apart from the seat 40 so that fluid can move through the seat passage 16.

Figure 4:
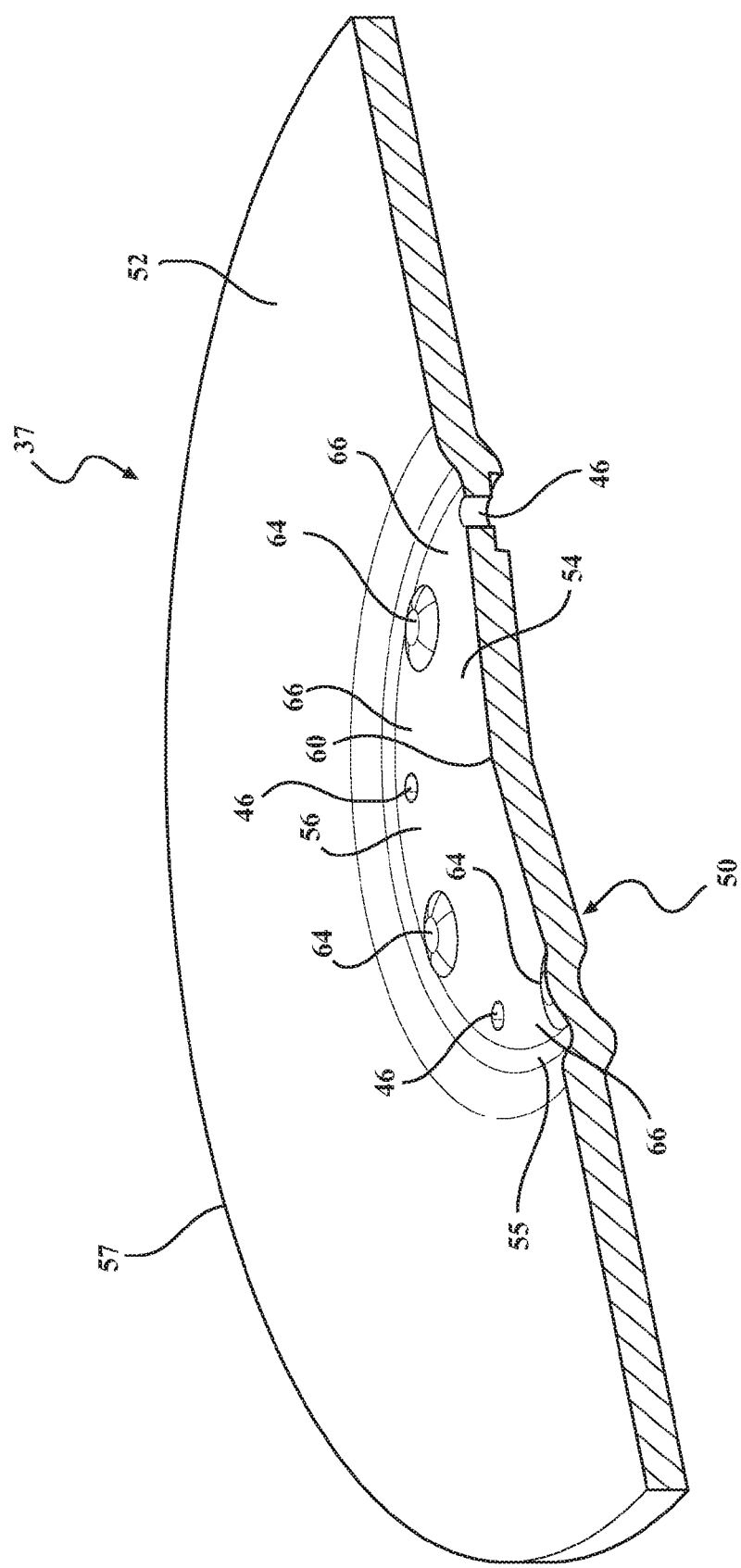
FIG. 4 is a cross-sectional perspective view from a flow entry side (or top side in the orientation of FIG. 1) of the orifice plate shown in FIGS. 1-3, according to the principles of the present disclosure.
Figure 5:
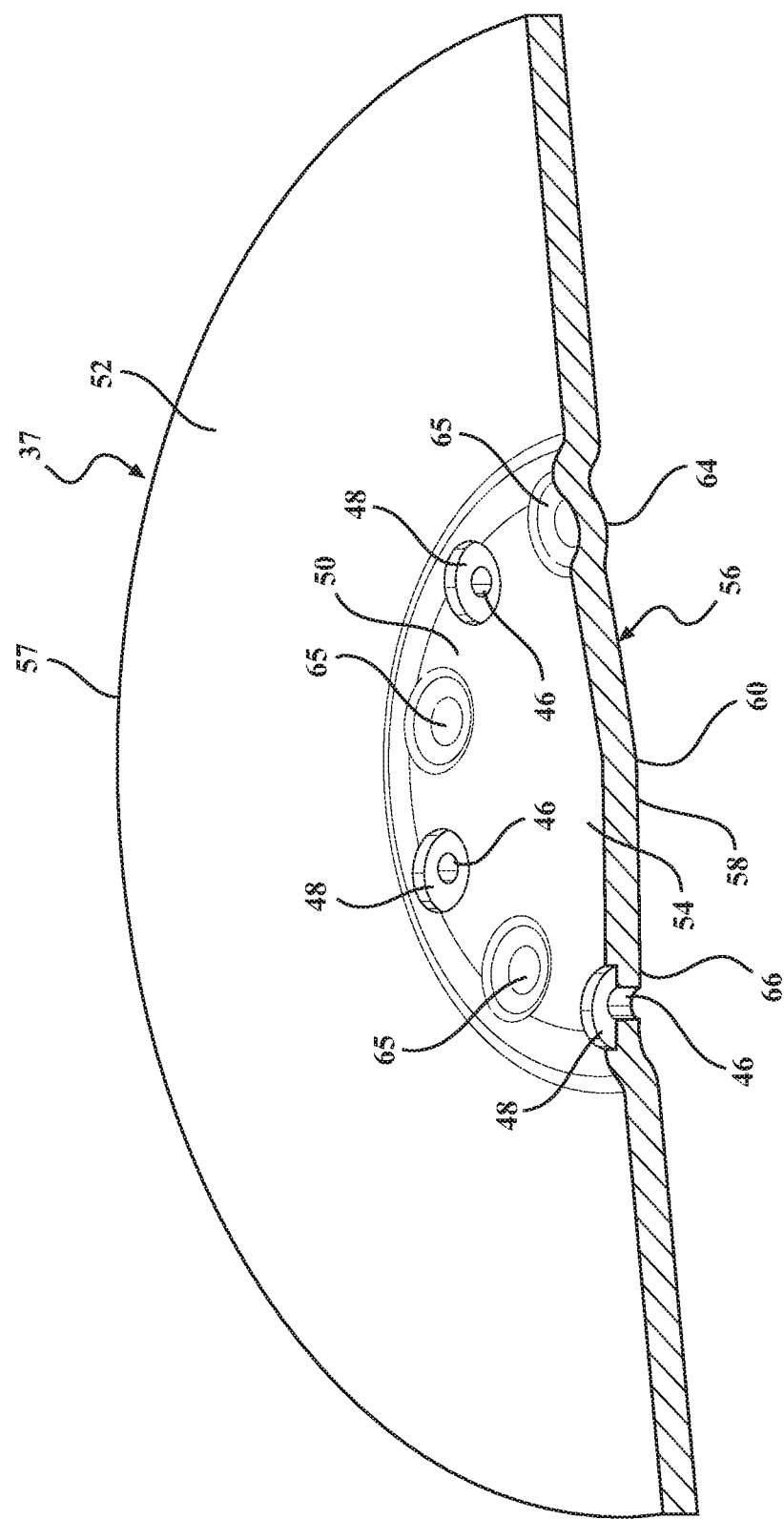
FIG. 5 is a cross-sectional perspective view from a flow exit side (or bottom side in the orientation of FIG. 1) of the orifice plate shown in FIGS. 1-4, in accordance with the principles of the present disclosure.
Figure 6:
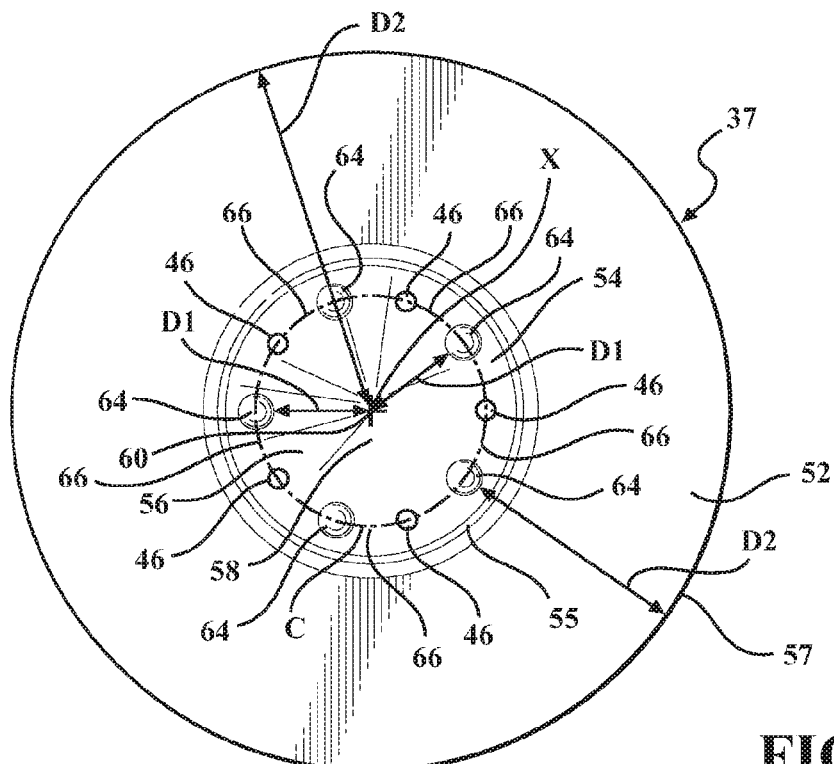
FIG. 6 is a plan view from a flow entry side (or top side in the orientation of FIG. 1) of the orifice plate shown in FIGS. 1-5, according to the principles of the present disclosure.
Figure 7:
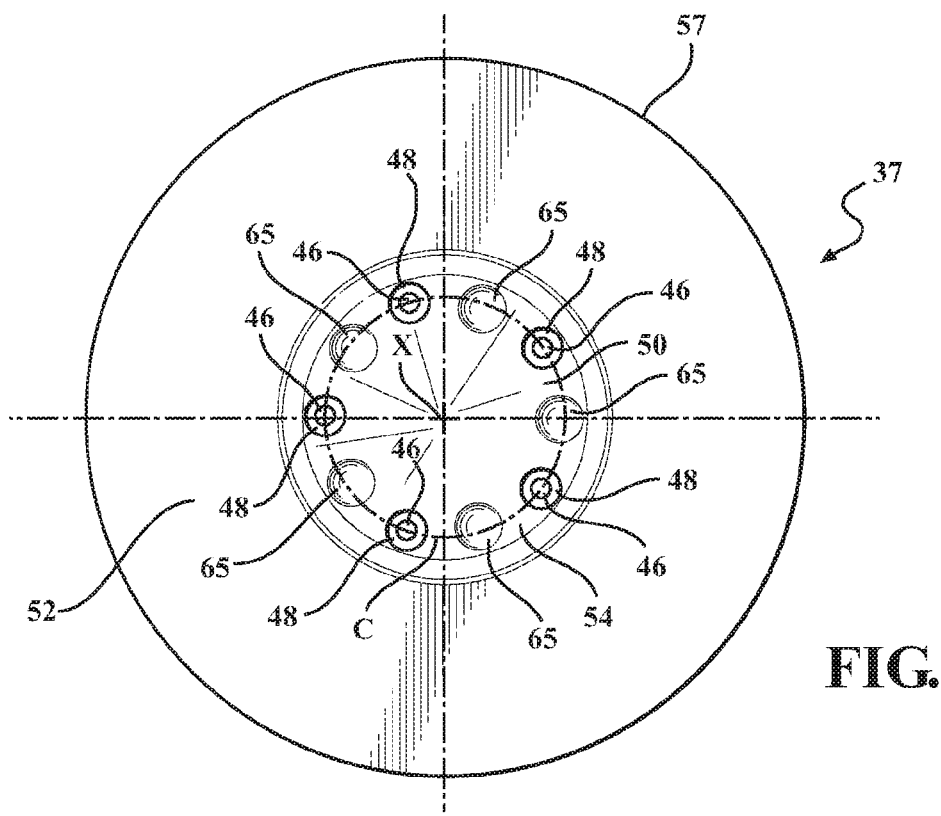
FIG. 7 is a plan view from a flow exit side (or bottom side in the orientation of FIG. 1) of the orifice plate shown in FIGS. 1-6, according to the principles of the present disclosure.
Figure 8:
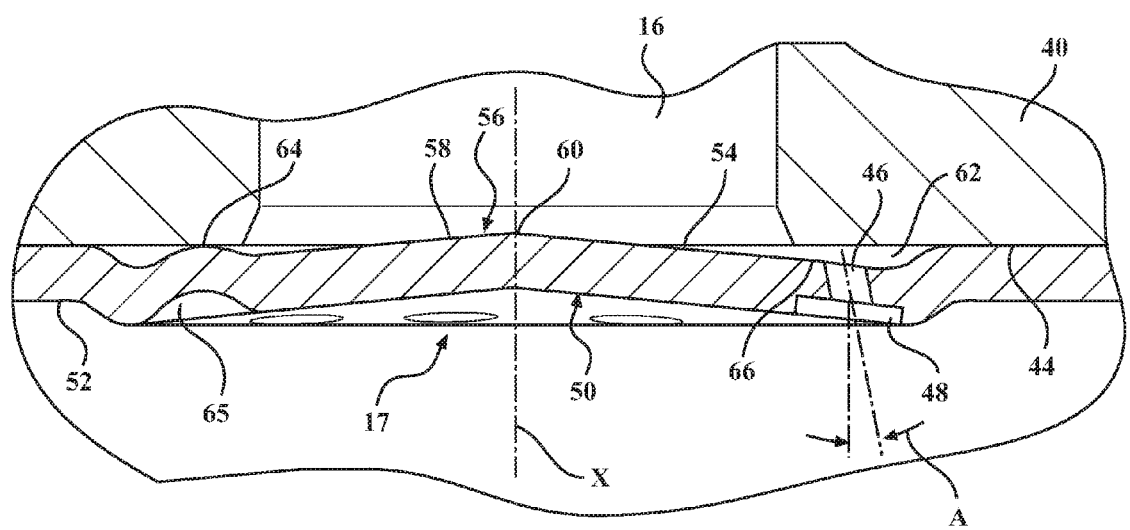
FIG. 8 is a side cross-sectional view of a portion of the RDU of FIGS. 1-3, including a portion of the orifice plate shown in FIGS. 1-7, in accordance with the principles of the present disclosure.

Referring now to FIGS. 2-8, additional details of the orifice plate 37 are shown and described. The orifice plate 37 has a plurality of offices 46 formed through it that assist with providing for a desired spray profile. FIGS. 4-5, for example, show three orifices 46, one of which is shown cut through in the cross-section for clarity. As only half of the orifice plate 37 is shown in FIGS. 4-5, it should be understood that, for example, the orifice plate 37 could have a total of five orifices 46, as shown in FIGS. 6-7. However, any suitable number of orifices for a desired spray profile could be used. Each orifice 46 includes a counter bore 48 on the flow exit side 50 of the orifice plate 37. Accordingly, each orifice 46 has a stepped orifice hole because the counter bore 48 has a larger diameter than the rest of the orifice 37. In this example, each orifice 46 is also disposed at an angle A with respect to the central axis X of the injector 12.

The orifice plate 37 is a single piece part, and has a base portion 52 unitarily formed with an offset portion 54. The base portion 52 is disposed along a base plane P, and the offset portion 54 is disposed at least partially outside of the base plane P, so that at least a portion of the offset portion 54 is non-coplanar with the base portion 52. The offset portion 54 defines the flow exit side 50 and a flow entry side 56 of the orifice plate 37. Surrounding the offset portion 54 is a circular inner side wall 55 which is substantially coaxial with a circular outer side wall 57 defining the perimeter of the orifice plate 37. Each of the side walls 55, 57 may also be coaxial with the central axis X of the injector 12.

In this example, the offset portion 54 forms a conical surface 58 having an apex 60 on the flow entry side 56 of the orifice plate 37. The conical surface 58 of the offset portion 54 is convex as viewed from the flow entry side 56 of the orifice plate 37 and concave as viewed from the flow exit side 50 of the orifice plate 37. However, in the alternative, the conical surface 58 of the offset portion 54 could be convex on the flow exit side 50, or the offset portion 54 could be planar and recessed from the base portion 52. The offset portion 54 defines the plurality of exit orifices 46 therethrough.

The base portion 52 of the orifice plate 37 is attached to the offset portion 54 of the seat 40 by welding. It may be desirable, for optimal spray atomization, to provide for a very small gap 62, such as a 50 micron gap, between the outer portion 44 of the seat 40 and the flow entry side 56 of the offset portion 54 at the point of the orifices 46. However, it would very easy to make a mistake in the welding operation and maintain a gap smaller than 50 microns or no gap at all, because 50 microns is very small and it is difficult to maintain such tight tolerances with a welding operation and in a fairly enclosed object like a fuel injector 12.

To solve this issue, a plurality of extensions 64 are formed in the offset portion 54. The extensions 64 are formed as protuberances or raised dimples on the offset portion, and the extensions 64 extend from the flow entry side 56. In other words, the extensions 64 are convex as viewed from the flow entry side 56 and concave as viewed from the flow exit side 50 of the offset portion 54. The concave undersides of the extensions 64 are illustrated at reference numbers 65.

The offset portion 54 defines a plurality of valleys 66 interposed with the plurality of extensions 64. The extensions 64 are separated by the valleys 66. For example, for every pair of extensions 64, there is a valley 66 in between.

The extensions 64 are configured to contact the outer surface 44 of the seat 40 so that fluid from the seat passageway 16 can flow adjacent to the extensions 64 and through the valleys 66. The valleys 66 provide paths for the fluid to flow from the seat passageway 16 to the exit orifices 46, and out of the outlet 17 of the injector 12. When the extensions 64 are in contact with the outer portion 44 of the seat 40, the outer portion 44 of the seat 40 and the projections 64 cooperate to define a plurality of gaps 62 between the outer portion 44 of the seat 40 and the orifice plate 37, where the gaps 62 provide paths for the fluid to flow from the seat passageway 16 to the exit orifices 46. Thus, the extensions 64 ensure that a gap 62 is maintained during the welding process. The plurality of extensions 64 and the plurality of valleys 66 provide for a minimum predetermined clearance, such as 50 microns, between the offset portion 54 of the orifice plate 37 and the outer portion 44 of the seat 40.

In this variation, each of the projections 64 is spaced equidistant, or about equidistant, from a center of the offset portion 54, by way of example. In this case, the center of the offset portion 54 lies along the central axis X at the apex 60 of the conical surface 58 of the offset portion 54. Accordingly, each projection 64 is spaced a distance D1 from the central axis X and apex 60 (shown in FIG. 6). The outer wall 57 defining the perimeter of the base portion 52 of the orifice plate 37 is circular and coaxial with the central axis X. Accordingly, each projection 64 is also spaced equidistant, or about equidistant, from the wall 57 defining the outer perimeter of the base portion 52. Each projection 64 is spaced a distance D2-D1 from the outer perimeter, or side wall 57 (shown in FIG. 6), wherein D2 is the diameter of the orifice plate 37 and/or the distance from the central axis X to the wall 57.

The plurality of projections 64 are disposed in a circular pattern defining a circle C (shown in FIGS. 6-7). The plurality of exit orifices 46 are also disposed along the circle C. Thus, each orifice 46 and each projection 64 are disposed equidistant, or about equidistant, from the center X, 60 of the offset portion 54, which is the distance D1.

The orifice plate 37 may be produced in a number of ways. In an embodiment, a series of progressive dies are used to form the plate 37. For example, the orifice plate 37 is initially in the form of a blank or base plate, which may have an overall thickness of 0.006 inches, by way of example. Dies may used to form the orifice holes 46, counter bores 48, and projections 64, or the orifice holes 46 and projections 64 could be formed in any other suitable way, without falling beyond the spirit and scope of the present disclosure.

The description is merely exemplary in nature and, thus, variations that do not depart from the gist of this disclosure are intended to be within the scope of the invention. Such variations are not to be regarded as a departure from the spirit and scope of the invention.

What is claimed is:

1. An orifice plate for an injector having an injector seat surface, the orifice plate comprising: a base portion disposed along a base plane; an offset portion unitarily formed with the base portion and being at least partially disposed outside of the base plane, the offset portion defining a flow entry side and a flow exit side, the offset portion defining a plurality of orifices therethrough; and a plurality of projections extending from the flow entry side of the offset portion, the plurality of projections in contact with the injector seat surface.

2. The orifice plate of claim 1, wherein the offset portion defines a plurality of valleys interposed with the plurality of projections to allow fluid to flow along the valleys.

3. The orifice plate of claim 2, wherein the plurality of projections are disposed in a pattern defining a circle.

4. The orifice plate of claim 3, the plurality of orifices being disposed along the circle.

5. The orifice plate of claim 4, wherein each projection of the plurality of projections is spaced equidistant from a center of the offset portion, relative to spacing of other of the plurality of projections.

6. The orifice plate of claim 5, wherein each projection of the plurality of projections is spaced equidistant from an outer perimeter of the base portion, relative to spacing of other of the plurality of projections.

7. The orifice plate of claim 5, each orifice of the plurality of orifices and each projection of the plurality of projections being disposed equidistant from the center of the offset portion.

8. The orifice plate of claim 7, wherein the offset portion defines a conical surface.

9. The orifice plate of claim 8, wherein a vertex of the conical surface extends from the flow entry side of the offset portion.

10. A reductant delivery unit for reducing nitrogen oxide (NOx) emissions from a vehicle, the reductant delivery unit comprising: a fluid injector having a fluid inlet, a fluid outlet, and a passageway providing a flow conduit from the fluid inlet to the fluid outlet, the fluid inlet being configured to receive a source of reducing agent and the fluid outlet being configured to communicate with an exhaust gas flow path of the vehicle so that the fluid injector controls injection of the reducing agent into the exhaust gas flow path, the fluid injector comprising: a valve closing member movable in the passageway between an open position and a closed position; a seat defining at least one seat passage in communication with the passageway, the seat having an inner portion and an outer portion, wherein the inner portion of the seat contiguously engages a portion of the valve closing member in the closed position thereby closing the at least one seat passage and preventing fluid from exiting the at least one seat passage, and wherein the valve closing member is spaced apart from the seat in the open position so that fluid can move through the seat passage; and an orifice plate having a base portion disposed along a base plane, the base portion being attached to the outer portion of the seat, the orifice plate having an offset portion unitarily formed with the base portion and being at least partially disposed outside of the base plane, the offset portion defining a flow entry side and a flow exit side, the offset portion defining a plurality of orifices therethrough, the orifice plate further comprising a plurality of projections extending from the flow entry side of the offset portion, the plurality of projections in contact with the outer portion of the seat of the fluid injector, the outer portion of the seat comprising an outer surface thereof.

11. The reductant delivery unit of claim 10, wherein the offset portion of the orifice plate defines a plurality of valleys interposed with the plurality of projections, the valleys providing paths for the fluid to flow from the seat passage to the orifices.

12. The reductant delivery unit of claim 11, the plurality of projections and the plurality of valleys being configured to provide for a minimum predetermined clearance between the offset portion of the orifice plate and the outer portion of the seat.

13. The reductant delivery unit of claim 12, the base portion of the orifice plate being welded to the outer portion of the seat.

14. The reductant delivery unit of claim 13, wherein a solenoid is disposed in the fluid injector, the solenoid being configured to move the valve closing member between the open position and the closed position.

15. The reductant delivery unit of claim 14, wherein each projection of the plurality of projections is spaced equidistant from a central axis of the fluid injector, relative to spacing of other of the plurality of projections.

16. The reductant delivery unit of claim 15, wherein the plurality of projections are disposed in a pattern defining a circle along the orifice plate, the plurality of orifices being disposed along the circle.

17. A fluid injector having an inlet, an outlet, and a passageway providing a fluid flow conduit from the inlet to the outlet, the fluid injector comprising: a valve closing member movable in the passageway between an open position and a closed position; a solenoid configured to be energized to move the valve closing member between the open position and the closed position; a seat defining at least one seat passage in communication with the passageway, the seat having an inner portion and an outer portion, wherein the inner portion of the seat contiguously engages a portion of the valve closing member in the closed position thereby closing the at least one seat passage and preventing fluid from exiting the at least one seat passage, and wherein the valve closing member is spaced apart from the seat in the open position so that fluid can move through the seat passage; and an orifice plate having a base portion disposed along a base plane, the base portion being attached to the outer portion of the seat, the orifice plate having an offset portion unitarily formed with the base portion and being at least partially disposed outside of the base plane, the offset portion defining a flow entry side and a flow exit side, the offset portion defining a plurality of orifices therethrough, the orifice plate further comprising a plurality of projections extending from the flow entry side of the offset portion, a portion of the projections of the plurality of projections in contact with the outer portion of the seat of the fluid injector, the outer portion of the seat comprising an outer surface thereof.

18. The fluid injector of claim 17, wherein the plurality of projections and the outer portion of the seat cooperate to define a plurality of gaps between the outer portion of the seat and the offset portion of the orifice plate, the gaps providing paths for the fluid to flow from the seat passage to the orifices.

19. The fluid injector of claim 18, wherein each projection of the plurality of projections is spaced about equidistant from a central axis of the fluid injector, relative to spacing of other of the plurality of projections.

20. The fluid injector of claim 19, wherein the plurality of projections are disposed in a pattern defining a circle along the orifice plate, the plurality of orifices being disposed along the circle.

21. The fluid injector of claim 17, wherein the fluid injector forms part of and is disposed in a reductant delivery unit.

22. The fluid injector of claim 1, wherein the plurality of projections contact an outer portion of a valve seat of a fluid injector, the injector seat surface comprising the valve seat of the fluid injector.

* * * * *